3,626,686
CRYSTAL CONTROLLED ELECTRIC CLOCK
John E. Harris, Bayshore, Ottawa, Ontario, Canada, assignor to Sperry Rand Canada Limited, Toronto, Ontario, Canada
Filed June 18, 1970, Ser. No. 47,463
Claims priority, application Canada, May 14, 1970, 82,826
Int. Cl. G04c 3/00
U.S. Cl. 58—23                                   7 Claims

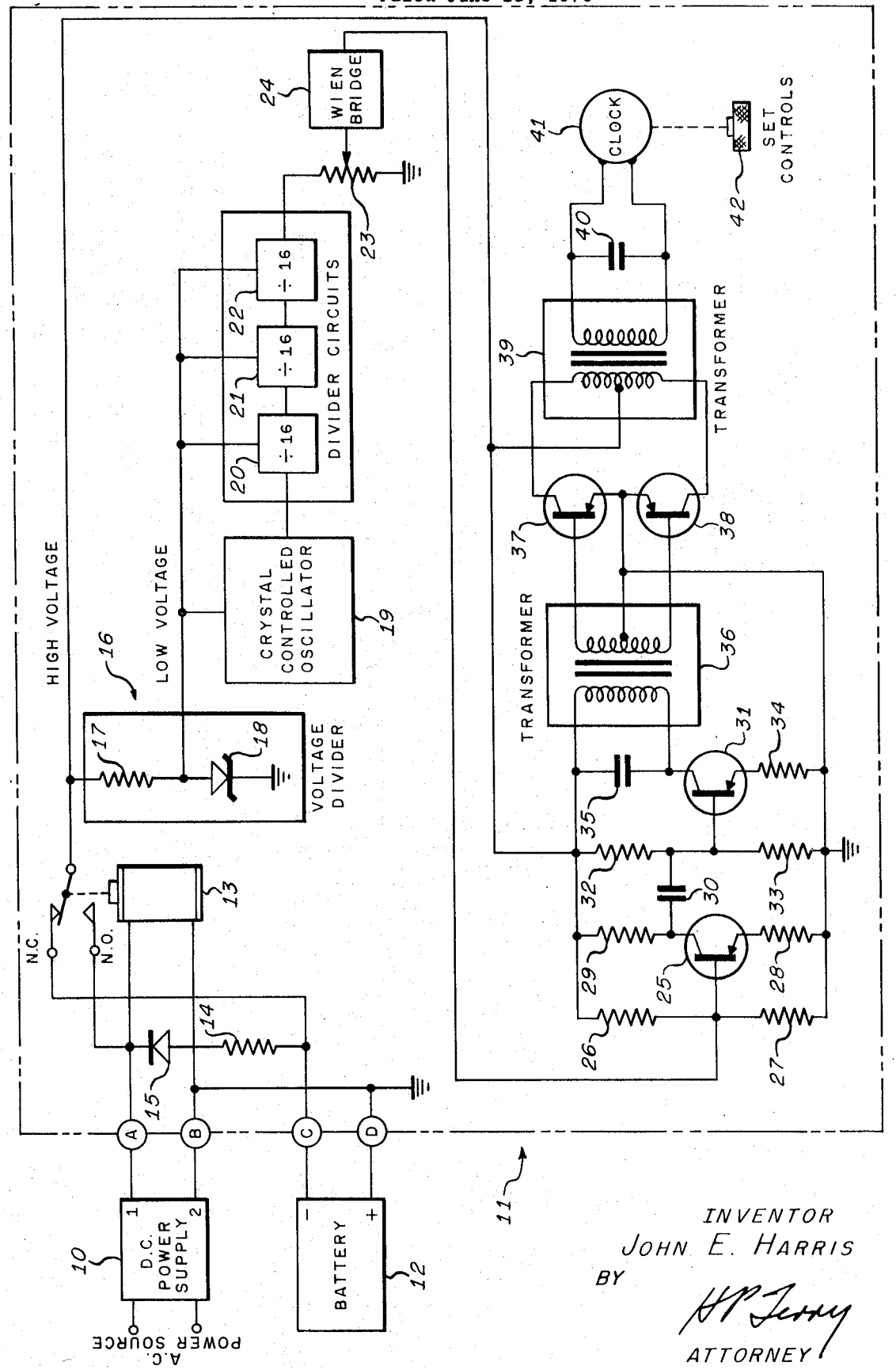

ABSTRACT OF THE DISCLOSURE

A crystal controlled voltage source in combination with an electric clock which provides a high accuracy time piece for use with mobile and remotely located electrical power sources. The device uses a D.C. voltage supply powered from an alternating voltage source which may be subject to frequency fluctuations. The D.C. output voltage energizes a crystal oscillator which generates a high frequency square wave. Integrated divider circuits divide-down the high frequency square wave to 60 hertz which is filtered and amplified thereby producing an alternating voltage source having a frequency stabilized sine waveshape output. The electric clock is operated from this voltage source to provide a highly accurate display of time.

BACKGROUND OF THE INVENTION

(1) Field of the invention

The subject invention pertains to the field of time indicating devices and more specifically to high accuracy electrical clocks especially useful with mobile or remotely located equipment.

(2) Description of the prior art

A conventional electrical clock contains a synchronous motor which provides the power for the analog or digital time display. The accuracy of the time indication provided by an electric clock is directly related to the frequency stability of the alternating voltage source. It is well known that in large permanent installations the frequency of the alternating voltage source is closely monitored and precisely controlled. The most common procedure used in frequency control is to count the number of cycles during an initial period and then increase or decrease the frequency as required in a subsequent period thereby obtaining the desired average number of cycles over both periods. This procedure requires access to an extremely high accuracy reference timing source to determine the duration of each period. Electric clocks operated from such controlled alternating voltage sources provide very accurate indications of time. However, a problem arises when the same clock is to be operated from an alternating voltage source in mobile or remotely located equipment. The frequency of this alternating voltage source is not closely monitored and precisely controlled, primarily, because the cost and size of the equipment to perform this function would be prohibitive for such an application. An additional problem encountered in mobile and remotely located equipment is intermittent operation. This type of equipment is subjected to frequent power failures, each of which will adversely affect the accuracy of the time indication. Further, upon the reapplication of power, the conventional electric clock will have to be reset.

SUMMARY OF THE INVENTION

The present invention permits small, lightweight construction at relatively low cost of a structure including a frequency stabilized alternating voltage source in combination with an electric clock. A standby battery provides continuous operation of the device during loss of power from the voltage source thereby maintaining the accuracy of the time display.

In the present invention, an alternating voltage source subjected to frequency fluctuations is connected to a standard D.C. power supply. The output of the D.C. power supply is applied to a voltage divider circuit which supplies voltage to a crystal oscillator through the energized contacts of a fail-safe relay. The crystal oscillator produces an accurate high frequency square wave output which is divided-down to a 60 hertz square wave in a series of low voltage integrated divider circuits. The 60 hertz square wave is filtered in a Wien bridge circuit that is tuned to approximately 60 hertz. The filtered signal is amplified in three transistorized high voltage stages of amplification. A high accuracy 60 hertz sine wave output signal is coupled through a step-up output transformer to an electric clock. A battery supply is connected through the de-energized contacts of the fail-safe relay to the crystal controlled voltage source. The battery is thereby automatically connected to the crystal controlled voltage source if a malfunction occurs resulting in a loss of the output power from the D.C. source supply. Additionally, the battery will be recharged automatically when the output power from the D.C. source supply is subsequently reapplied.

BRIEF DESCRIPTION OF THE DRAWING

The drawing is a schematic diagram partially in block form of a preferred embodiment of the invention.

DESCRIPTION OF THE PREFERRED EMBODIMENT

The invention will be described with reference to FIG. 1. An alternating voltage source subject to frequency fluctuations is applied to a D.C. power supply 10. The D.C. minus potential output terminal 1 and the ground terminal 2 from the D.C. power supply 10 are connected to terminals A and B, respectively, of the crystal controlled electric clock 11. The negative and positive terminals of a battery 12 are connected to the circuit terminals C and D, respectively, of the crystal controlled clock 11. The circuitry within the crystal controlled clock 11 includes the coil of a fail-safe relay 13 which is connected between the terminals A and B. A normally open contact of the relay 13 is connected to terminal A and a corresponding normally closed contact of the relay 13 is connected to terminal C. The terminals B and D are connected to ground and a limiting resistor 14 and a blocking diode 15 are series connected between the terminals A and C thereby enabling charging of the battery 12 during the presence of a nominal output from the D.C. power supply 10. The switching contact of the fail-safe relay 13 is routed to a voltage divider 16 which may include a series connected power resistor 17 and a Zener diode 18. The output of the voltage divider 16 provides the supply voltage for a crystal oscillator 19 and three divider circuits 20, 21 and 22 from the junction of the resistor 17 and the Zener diode 18. The three integrated divider circuits 20, 21 and 22 are series connected between the output of the crystal oscillator 19 and an amplitude control 23 which may be a variable resistance having one terminal connected to ground. The output of the amplitude control 23 is coupled to the input of a Wien bridge circuit 24 which is tuned to approximately 60 hertz. The Wien bridge circuit output is connected to the input of two high voltage transistorized stages of class A type amplifiers. In the first stage, the input is connected to the base of a p-n-p transistor 25 and the junction of bias resistors 26 and 27. The other terminals of the resistors 26 and 27 are connected to high voltage and ground, respectively. A bias resistor 28 is connected between the emitter of the transistor 25 and ground while a load resistor 29 is connected between the collector of transistor 25 and high voltage. A coupling capacitor 30 is connected between the collector of transistor 25 and the input to the second stage of the amplifiers. In the second stage the input is connected to the base of a p-n-p transistor 31 and the junction of bias resistors 32 and 33. The other terminals of the resistors 32 and 33 are connected to high voltage and ground, respectively. A bias resistor 34 is connected between the emitter of the transistor 31 and ground. The collector load of the second stage amplifier comprises a parallel combination of a capacitor 35 and the primary winding of a transformer 36 connected between the collector of the transistor 31 and high voltage. The secondary winding of the transformer 36 is connected to a single high voltage stage of a class B push-pull type amplifier which includes a pair of p-n-p transistors 37 and 38. A first output terminal from the secondary winding of the transformer 36 is connected to the base of the transistor 37 and a second output terminal is connected to the base of the transistor 38. The emitters of the transistors 37 and 38 and the center tap on the secondary winding of the transformer 36 are connected to ground. The collectors of the transistors 37 and 38 are connected to the first and second input terminals, respectively, on the primary winding of a transformer 39 having a center tap connected to high voltage. A parallel circuit consisting of the combination of a capacitor 40 and the secondary winding of the transformer 39 provides an output alternating voltage of stabilized frequency to a conventional electric clock 41 which may have a digital or analog display. Set control 42 enables initial setting of the electric clock 41 to a precise time. It is well known that there are several variations available for connecting the clock 41 to the output of the transformer 39. The easiest and most common connection employed is to connect the secondary winding of the transformer 39 to a conventional receptacle and plug in the line cord provided with the electric clock 41. An alternative variation is to connect the secondary winding of the transformer 39 to the switching contacts of an ON-OFF switch and connect leads from the synchronous motor within the clock to the normally open set of contacts. The ON-OFF switch could be a double throw ON-OFF switch and a resistive load may be connected across the second set of normally open contacts thereby providing continuous loading for the output of transformer 39. Further, the ON-OFF switch can enable the clock to be set initially to accurate time signals such as the radio transmission from WWV or CHU.

In a specific embodiment of this invention, the D.C. power supply provided −14 volts D.C. to the coil of the fail-safe relay 13. Upon being energized, the fail-safe relay 13 coupled the −14 volts D.C. through the normally open contact and the switching contact to the voltage divider 16. A potential of −3.6 volts D.C. obtained from the junction of the resistor 17 and the Zener diode 18 was applied to the crystal oscillator 19. The crystal oscillator 19 operating in the series resonant mode produced a square wave output at 245,760 hertz which was applied to the series connected divider circuits 20, 21 and 22. Each circuit divided the square wave input by a factor of 16 thereby producing a square wave output at 60 hertz. This square wave output was applied through the amplitude control 23 and the Wien bridge 24 to the input of the amplifiers. The amplifiers and the output transformer, which is coupled to the electric clock, amplified and stepped up the 60 hertz amplifier input to produce an output of 115 volts A.C. The amplitude control 23 was adjusted to obtain a nominal output of 100 volts A.C. The combination of the Wien bridge 24 which is tuned to approximately 60 hertz and the capacitors 35 and 40 filtered out the harmonics contained in the 60 hertz square wave to provide an output comprised of the fundamental sine wave shape at 60 hertz.

The battery 12 operated at a nominal output of 13.5 volts and 0.75 amp. and was rated for one hour of continuous operation with a recharge time of 18 hours. The standard electric clock required 3.7 watts of power while operating at a nominal voltage of 100 volts A.C. and 60 hertz. The crystal controlled clock unit had an accuracy of 0.5 second per day when the crystal used was rocked to 245,760±1 hertz.

It will be appreciated by those skilled in the art that this invention can be readily manufactured with miniaturized components at a very low cost in comparison to the price of equipment presently available.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:
1. An electric timing apparatus comprising
controlled oscillator means for generating a low voltage square wave output of high frequency,
switching means for applying a primary voltage to said controlled oscillator means,
divider means connected to said controlled oscillator means for substantially reducing said high frequency of said square wave output, and
filter means having an input connected to said divider means and an output connected to amplifier means for obtaining a stable fundamental frequency from said reduced frequency square wave,
said amplifier means for providing an alternating high voltage output signal of said stable fundamental frequency adapted to be coupled to clock display means for providing a highly accurate display of time.
2. An electric timing apparatus as described in claim 1 in which said controlled oscillator includes a crystal controlled oscillator.
3. An electric timing apparatus as described in claim 1 in which said divider means includes series connected integrated divider circuits.
4. An electric timing apparatus as described in claim 1 in which said amplifier means includes transistorized circuits having a transformer coupled output stage connected for class B push-pull operation.
5. An electric timing apparatus as described in claim 1 in which said filter means comprise the combination of Wien bridge circuit and a plurality of circuits including capacitors and transformer windings connected in parallel which remove harmonics contained in said square wave signal and produce a highly accurate fundamental sine waveshape.
6. An electric timing apparatus as described in claim 1 in which said switching means includes a voltage controlled relay which automatically applies a secondary voltage to said controlled oscillator means during interruption of said primary voltage.
7. An electric timing apparatus as described in claim 1 in combination with electric clock display means for providing a highly accurate indication of time.

References Cited
UNITED STATES PATENTS 3,137,121   6/1964   Tringali _____ 58—24

RICHARD B. WILKINSON, Primary Examiner

E. C. SIMMONS, Assistant Examiner

U.S. Cl. X.R.

340—248 B